United States Patent [19]
Turner

[11] Patent Number: 5,307,858
[45] Date of Patent: May 3, 1994

[54] UNIVERSAL WINDOW SHUTTER SYSTEM

[76] Inventor: Jean A. Turner, 616 El Paso, Jacksonville, Tex. 75766

[21] Appl. No.: 849,924

[22] Filed: Mar. 12, 1992

[51] Int. Cl.⁵ .............................................. E05D 15/00
[52] U.S. Cl. .................................... 160/213; 160/377; 403/243
[58] Field of Search ............... 160/117, 118, 119, 210, 160/213, 369, 371, 372, 374, 378, 377, 381, 135, 199, 206, 351, 379; 403/243, 247, 248, 249, 256, 257, 258, 260, 263

[56] References Cited

U.S. PATENT DOCUMENTS

| | | | |
|---|---|---|---|
| 1,939,781 | 12/1933 | Kelsey | 160/206 |
| 2,600,192 | 6/1952 | Bell | 160/378 X |
| 2,684,714 | 7/1954 | Corey | 160/199 |
| 2,923,027 | 2/1960 | Bury | 160/117 X |
| 3,111,208 | 11/1963 | Grossman | 160/199 X |
| 3,440,786 | 4/1969 | Weaver | 160/213 |
| 4,013,372 | 3/1977 | Lay et al. | 403/258 X |
| 4,083,641 | 4/1978 | Sado | 403/258 X |
| 4,373,570 | 2/1983 | Nussdorf et al. | 160/351 X |
| 4,516,620 | 5/1985 | Mulhern | 160/351 |

*Primary Examiner*—David M. Purol
*Attorney, Agent, or Firm*—Baker & Botts

[57] ABSTRACT

A universal window shutter system includes vertical frame member components and horizontal frame member components to be assembled to form shutter panel frames which are covered with shutter panel covers and which are hingeably interconnected to form shutter units to be installed in a window opening as a functional and attractive window covering. Vertical frame member components include a hinged single vertical component for hinged connection of a shutter panel to a window frame, a hinged double vertical component for hinged connection between two panels, and latching vertical components for selective latching of two shutter units together at their mating edges. Frame member components are available in various lengths and are easily adjustable in length for precise user dimensional control. The method of using the window shutter system generally includes the steps of identifying a window to receive shutter units, determining the desired shutter configuration, determining the shutter frame components needed to assembly the desired configuration and the component dimensions appropriate for the window to the covered, obtaining the identified components, forming a shutter panel cover as desired, assembling shutter panels and connecting the panels to form shutter units, and installing the shutter units in the frame of the window to be covered.

2 Claims, 3 Drawing Sheets

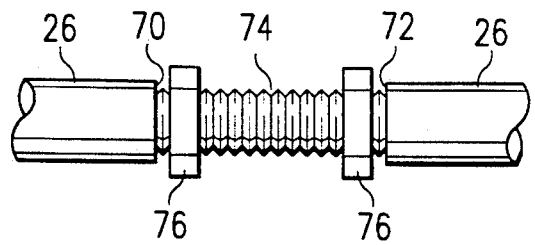
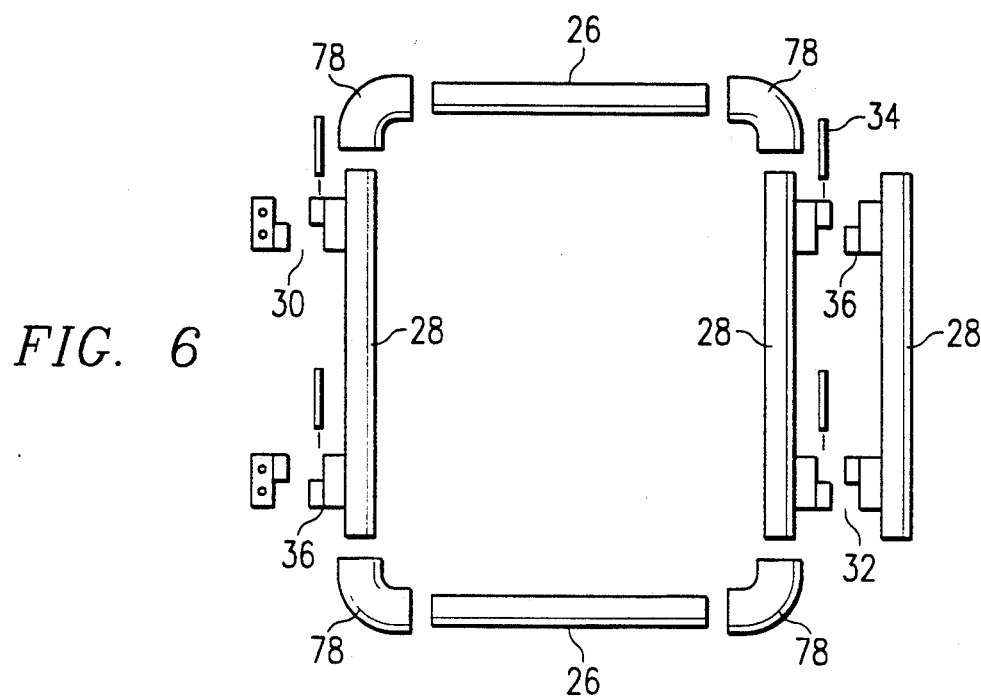
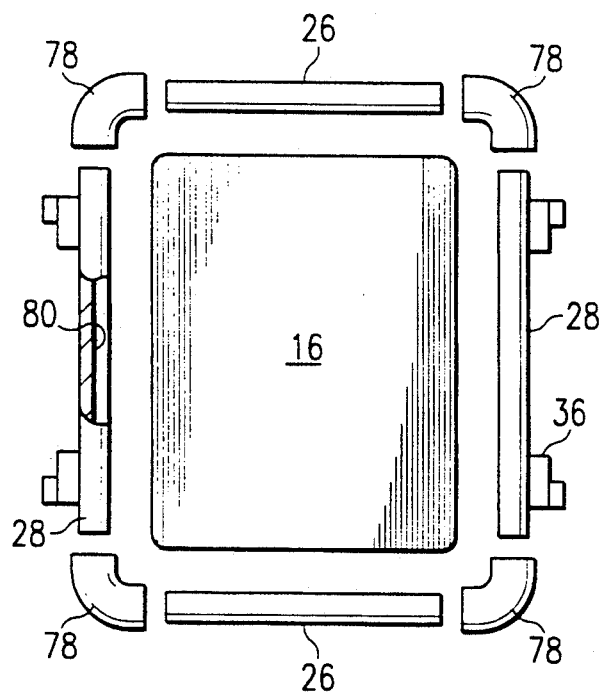

UNIVERSAL WINDOW SHUTTER SYSTEM

FIELD OF THE INVENTION

The present invention generally relates to the field of window coverings, and in some of its embodiments more specifically relates to a universal window shutter system with interchangeable components, and to a method of using the window shutter system.

BACKGROUND OF THE INVENTION

The practice of covering window openings for the purpose of controlling, for example, the ingress of wind and rain, the ingress and egress of people, the ingress and egress of light, and obscuring vision is very old and well known. A variety of materials and structures have been used for that purpose, including exterior shutters, interior curtains, drapes, shades, and blinds. While the use of window covering to achieve the useful purposes of controlling the ingress of light and maintaining privacy by obscuring vision through windows in structures has continued to be important, aesthetic considerations of window covering design and appearance have become increasingly significant.

Of the types of interior window coverings in common use, window shutters are among the most effective in allowing selective control of degree of window coverage and are also considered to be among the most desirable from an aesthetic perspective. However, shutters have had and continue to have the disadvantages of relatively high cost and difficulty of installation. Two basic types of interior window shutters are known in the prior art; those constructed completely of wood or the like, and those having a frame of wood or the like with a fabric insert. Both types are available to the user only in pre-assembled form, in which the dimensions of the shutter frame are fixed, except for some limited trimming allowance for final fit adjustment. It is also typically necessary for interior shutters to require professional installation, especially in situations in which window openings are not completely square, as is common in older structures. A further disadvantage of window shutters of the prior art is associated with the fact that such shutters are typically provided in an unfinished condition. Therefore, the complete surfaces of the shutters, or at least the frames of the fabric insert type, must be painted or otherwise finished as part of the installation steps, adding to the expense and/or difficulty.

There remains an unfilled need in the field for an interior window shutter which is inexpensive to produce, is easily provided in component form, may be readily assembled and installed by the user, requires no painting or other finishing at the time of installation, is aesthetically pleasing, and otherwise generally overcomes the disadvantages of shutter types known in the prior art. Accordingly, it is among the objects of the present invention to provide a window shutter system which is inexpensive to produce and provide to the final user. It is a further among the objects of the present invention to provide a window shutter system which is particularly suitable to being provided in the form of interchangeable components. It is additionally among the objects of the invention to provide a window shutter which may be easily assembled and installed by the final user. It is still further among the objects of the invention to provide a window shutter which requires no painting or other finishing by the final user. It is yet further among the objects of the invention to provide an aesthetically pleasing window shutter which overcomes the disadvantages and drawbacks of the prior art. It is still additionally among the objects of the present invention to provide a method of using the window shutters of the invention.

SUMMARY OF THE INVENTION

The present invention provides an interior window shutter system particularly suitable for being provided to the final user in unassembled component form so that the user may select and obtain shutter frame and connector components and then assemble those components into shutters of the desired dimension and configuration. Each shutter component is designed to be independently selectable and universally interconnectable, so that the user need only determine the desired shutter configuration and dimension and then obtain the number of and dimension of component pieces needed to form the final shutter assembly. The components are designed to be assembled and installed with the use of a minimum number of simple hand tools by a person with no more than rudimentary mechanical skills. The components of the window shutter system can be interconnected in a variety of ways to form a variety of shutter configurations, including single panel shutters, double panel bifold shutters, and three panel shutters, with additional options of single tier or multiple tier configurations for each window to be covered.

The window shutter system of the invention most generally comprises vertical frame components, with pre-attached hinges, hooks, and latches, and horizontal frame components to be interconnected between vertical components to form the shutter frame structure. In the preferred embodiment, the vertical frame components are provided in four distinct configurations, with each vertical frame component generally comprising an elongate tubular member with open first and second ends. In the first configuration, a pair of hinges is interconnected to the elongate member for the purpose of interconnecting the member to a window frame. In the second configuration, two elongate members are disposed in parallel relation and interconnected by a pair of hinges so that the component can be used as the common element between two hingeably interconnected shutter panels. In the third configuration, the hook portion of a hook and stud or hook and eye latch assembly is interconnected to a single elongate member, and in the fourth configuration, the stud or eye portion of the latch assembly is interconnected to a single elongate member, so that adjacent shutter panels may be latched together in a closed position. Only a single configuration of the horizontal component of the shutter system is required, and that horizontal component configuration generally comprises an elongate tubular member to be interconnected between aligned ends of two vertical members to form one end of a generally rectangular shutter panel frame. In the preferred embodiment, described in detail below, the shutter system also includes resilient inserts, each to be received and retained in one end of a vertical member and each having an aperture coaxially aligned with and extending into the interior of the insert from one end thereof, and fastener pins, each to be extended through an aperture near one end of a horizontal member and into the aperture in a resilient insert to connect the horizontal member to the vertical member.

The shutter panels formed with the shutter system of the invention are particularly suited to receive a fabric covering to complete the construction of each shutter panel. Each panel covering extends between the opposed parallel vertical members and between the opposed parallel horizontal members of each shutter panel frame. As described below in more detail, it is preferred that each horizontal elongate member be extended through a tunnel formed at the associated edge of the panel covering before the vertical and horizontal members are interconnected, but it will be understood that any convenient means of attaching each panel covering to the respective shutter panel frame members may be utilized.

In the method of using the shutter system of the invention, the user first measures the window opening to receive shutters and determines the desired shutter configuration for the window. The user then selects the configurations and dimensions of the shutter frame components needed to construct the desired shutter, and selects the panel covering material to be used for the shutter. The appropriate number of panel covers are then formed, typically by cutting a rectangular piece of covering material for each panel cover, folding over at least one set of opposed edges and stitching each folded over edge to form a continuous tunnel. Vertical shutter component members and/or horizontal shutter component members are extended through appropriate opposed tunnels in the panel cover, and the shutter component members are interconnected to complete assembly of that shutter panel. The remaining panels of the shutter unit are assembled in similar manner. When the shutter unit is assembled, it is installed in the window by placing the unit in the window opening and connecting each window frame hinge to the window frame with screws or other convenient means.

The structure of the preferred and alternative embodiments of the window shutter system of the invention, and the preferred and alternative embodiments of the method of the invention will be described in more detail below with reference to the accompanying drawing figures.

BRIEF DESCRIPTION OF THE DRAWINGS

FIG. 5 is a partial view of an alternative embodiment of a shutter panel frame member, illustrating a means for length adjustment.

FIG. 6 is a partially separated front elevation view of an alternative embodiment of the window shutter system of the invention.

FIG. 7 is a partially separated front elevation view of a further alternative embodiment of the window shutter system of the invention.

DETAILED DESCRIPTION OF THE INVENTION

Figure 1:
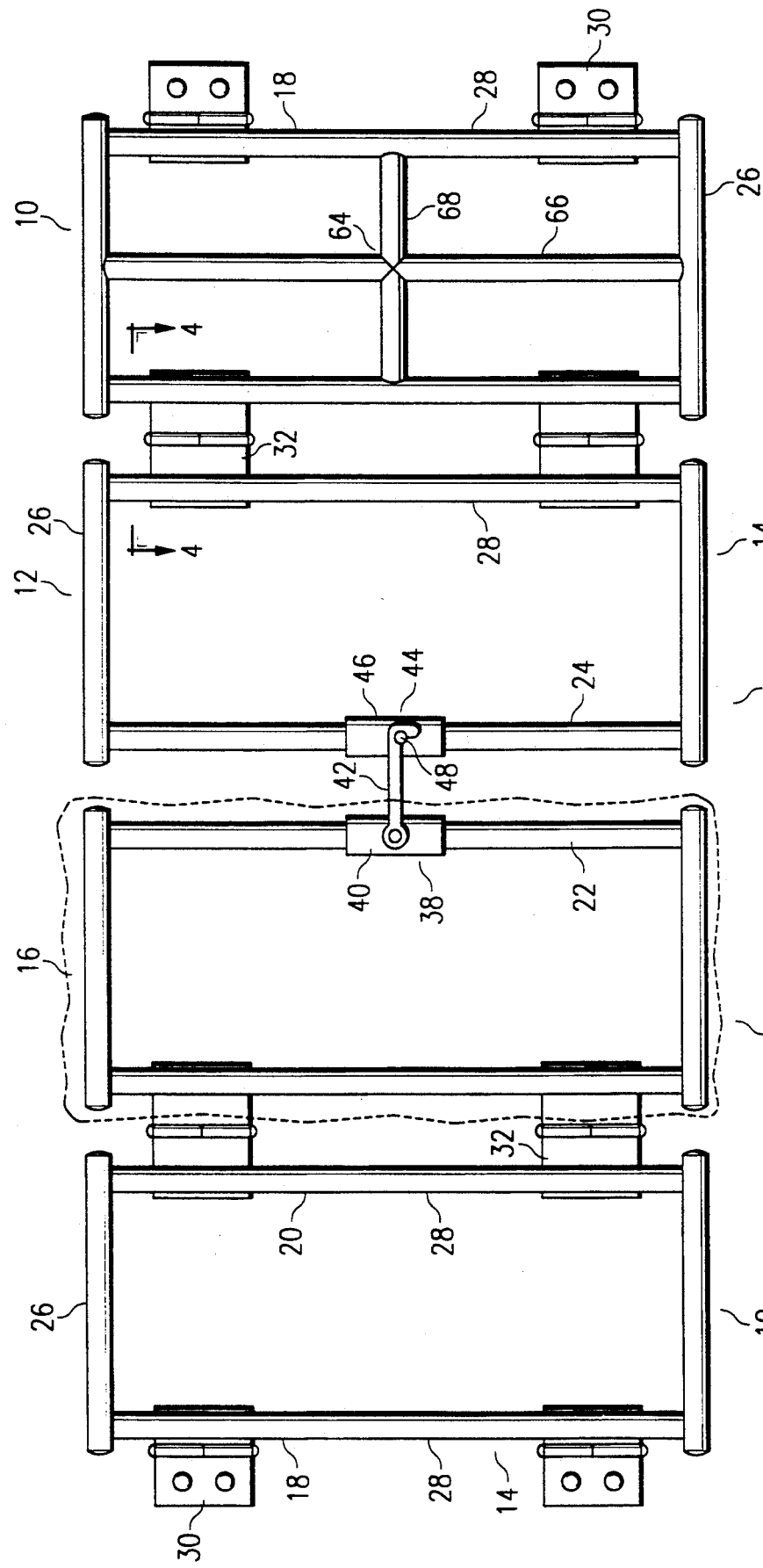
FIG. 1 is a front elevation view of the preferred embodiment of the window shutter system of the invention.
Figure 2:
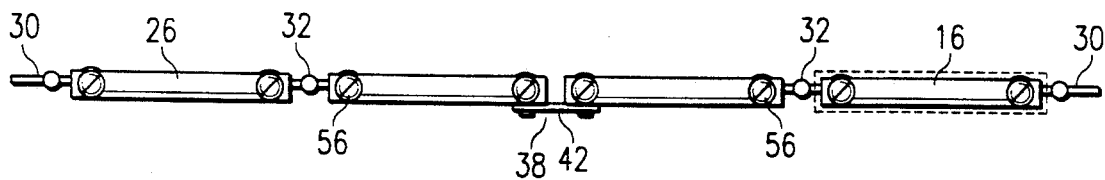
FIG. 2 is a top plan view of the preferred embodiment of the window shutter system of the invention.

With reference to the accompanying drawing figures, and with initial emphasis on FIG. 1, the window shutter system of the invention, generally designated by reference numeral 8, is used to produce a shutter unit having a plurality of independent shutter panels. The shutter unit depicted in FIG. 1 is configured with outer panels 10 and center panels 12, forming a single tier bi-fold shutter unit, though it will be readily understood that a wide variety of shutter unit configurations may be formed from the shutter system of the invention. Each independent shutter panel includes a perimeter frame 14 and a panel cover 16, connected to frame 14.

Each perimeter frame 14 is formed from interconnectable shutter system components, including, in the preferred embodiment, single hinged vertical components 18, double hinged vertical components 20, single hook vertical components 22, single latch vertical components 24, and horizontal components 26. An elongate open ended tubular member 28, preferably circular in cross-sectional configuration and having a hollow interior, is common to each vertical component of the shutter system components. Each single hinged vertical component 18 also includes a pair of hinges 30, with each hinge 30 interconnected to tubular member 28 near one end thereof and extending outwardly therefrom in aligned relation. Hinges 30 are connected to the structural frame of a window during installation of the assembled shutter unit.

Each double hinged vertical component 20 includes a pair of tubular members 28, disposed in aligned parallel relationship, with a pair of hinges 32 interconnected between the tubular members 28 to pivotally connect those members. Each hinge 32 is disposed near the respective aligned ends of the tubular members 28. Hinges 30 and 32 include a central pivot 34 and opposed plates 36 joined at the central pivot 34. In the preferred embodiment, each plate 36 of hinges 30 and 32 which is interconnected to a tubular member 28 is shaped to match the configuration of the outer surface of tubular member 28. It is preferred that tubular members 28 and hinges 30 and 32 be of metallic material, and plates 36 are connected to tubular members 28 by welding or other convenient conventional means.

Each single hook vertical component 22 includes a tubular member 28 and a hook assembly 38 disposed intermediate the ends of tubular member 28 and interconnected thereto. In the preferred embodiment, hook assembly 38 includes a base 40 and a hook 42 pivotally interconnected thereto, as shown in FIG. 1. Similarly, each single latch vertical component 24 includes a tubular member 28 and a latch assembly 44. In the preferred embodiment, each latch assembly 44 includes a base 46 and a stud 48 to receive and retain hook 42. It will be understood that hook 42 and stud 48 may be interconnected directly to the respective tubular members 28, that stud 48 may be replaced by an eye to receive the end of hook 42, and/or that other latching means may be employed within the scope of the invention. As an example of an alternative embodiment, single hook vertical component 22, with hook 42 attached, may be eliminated and only single latch vertical component 24 provided, with stud or eye 48, and hook 42 may be provided as a separate component designed to be connected to a stud or eye 48 during assembly. With this alternative, component 24 is used to form the vertical frame sides of shutter panels to be latched together, and hook 42 is attached to one of the components 24 as one of the assembly steps.

Figure 3:
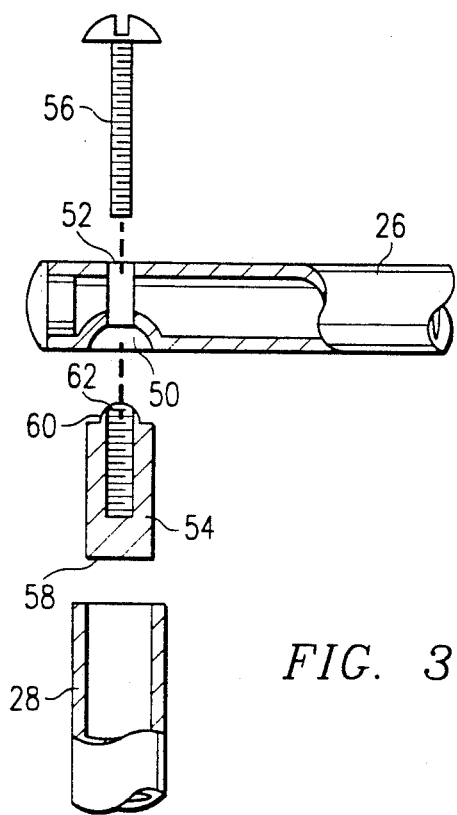
FIG. 3 is a sectioned partial view of a shutter panel frame, showing a vertical frame member, a horizontal frame member, a resilient insert, and a fastener pin in separated relationship.
Figure 4:
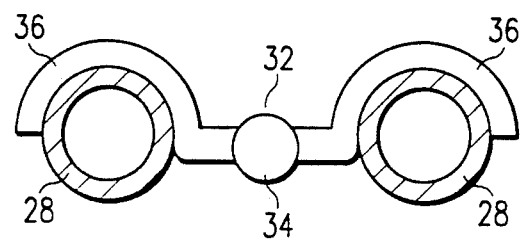
FIG. 4 is a sectioned view of the preferred embodiment of the window shutter system of the invention, along line 4—4 of FIG. 1.

Each horizontal component 26 of the shutter system of the invention comprises an elongate rod, preferably with a cross-sectional configuration matching the cross-sectional configuration of tubular members 28. As illustrated in FIG. 3, a concave depression 50 is formed near each end of each horizontal component 26, with the axis of each depression 50 perpendicular to the longitudinal axis of horizontal component 28. An aperture 52, coaxially aligned with the associated depression 50, extends through each end of each horizontal component 26, so that each depression 50 and associated aperture 52 combine to form a passageway through each end of each horizontal component 26 perpendicular to the longitudinal axis of that component.

The shutter system of the invention also includes a plurality of inserts 54 and fastener pins 56, also shown in FIG. 3. Each insert 54, which is preferably formed of a resilient material, has a first end 58 and a second end 60, and is configured and dimensioned so that when first end 58 is inserted into an open end of a tubular member 28 insert 58 will be received and retained in member 28 with second end 60 extending slightly beyond the end of member 28. Second end 60 of insert 54 is configured to be received in a mating depression 50 of a horizontal component 26, and includes aperture 62 extending into the interior of insert 54 from second end 60 in alignment with the longitudinal axis of insert 54. During assembly of each shutter panel, a fastener pin 56 is inserted through aperture 52 of a component 26 and into aperture 62 of an insert 54 in place within the end of a tubular member 28 to form a secure connection between horizontal component 26 and the vertical component of which the tubular member 28 is a part. In order to form and maintain a secure connection, it is preferred that fastener pins 56 be threaded and it is further preferred that the cross-sectional dimension of apertures 62 be slightly smaller than the cross-sectional dimension of fastener pins 56, so that each insert 54 is expanded within the associated tubular member 28 as a fastener 56 is inserted, ensuring a secure connection.

The preferred embodiment of the shutter system of the invention further includes shutter panel bracing components, illustrated in FIG. 1 and designated by reference numeral 64. Each bracing component 64 is preferably formed as illustrated, with a vertical brace 66 and a horizontal brace 68 to ensure that independent shutter panels maintain their rectangular configuration during use, but it will be understood that other effective panel bracing configurations, such as one or more angle braces extending between opposite upper and lower corners, may be utilized.

In final assembled form, the window shutter system of the invention includes panel covers 16. In the preferred embodiment, each panel cover 16 comprises a piece of fabric selected and provided by the final user, although panel covers could be provided with the shutter frame components if desired. It is preferred that each panel cover 16 be prepared for use with the associated shutter panel frame with an open ended tunnel at each end of panel cover 16, each tunnel to receive a horizontal component 26 during assembly of the shutter unit. After assembly, each panel cover 16 is preferably lightly stretched between horizontal components 26 and extends over the vertical members 28 of the shutter panel without attachment to such vertical members.

The window shutter system of the invention is particularly suited for being supplied to the user as individual components or in kit form, so that the user may select component dimensions as appropriate for a particular installation. In order to minimize the number of length variations to be provided, each vertical member 28 of the preferred embodiment of the shutter system of the invention is designed so that it may be readily adjusted in length by trimming the ends of the member prior to insertion of inserts 54 during assembly. To provide for adjustability, hinges 30 and 32 are preferably disposed a sufficient distance inward from the ends of the associated vertical member 28 so that a reasonable length may be trimmed from each end without interfering with the associated hinges.

Horizontal components 26 of the preferred embodiment are not readily susceptible to length adjustment, due to the presence of a depression 50 and aperture 52 at each end of the horizontal components. Accordingly, horizontal components 26 may be provided to the user with a broader selection of standard lengths. Alternatively, horizontal components 26, and vertical members 28 if desired, may be made adjustable by means other than trimming the ends of the member. In one such alternative embodiment, illustrated in FIG. 5, each tubular component 26 is divided intermediate its two ends to form internal ends 70 and 72, which are provided with internal threads to receive threaded adjustment rod 74 and adjustably interconnect the two portions of component 26. In order to fix each component 26 at the desired length, lock nuts 76 may be provided. If desired, vertical members 28 may be provided with the same length adjustment means as an alternative to trimming the ends of the vertical members.

It will be understood that modifications may be made in, for example, the manner of interconnecting vertical members and horizontal components to form shutter panels without departing from the scope of the invention. In one such alternative embodiment, illustrated in FIG. 6, vertical members 28 are formed as in the preferred embodiment, horizontal components 26 are formed as simple uniform members without depressions 50 and apertures 52, and corner connectors 78 are used to interconnect the vertical and horizontal members. Each corner connector 78 is formed to receive and retain an end of a vertical member and an end of a horizontal component during assembly of a shutter panel. The alternative embodiment of FIG. 6 allows the length of horizontal components 26 to be adjusted by trimming each component to the desired length.

FIG. 6 also illustrates an alternative approach to the design of hinges 30 and 32, which allows a reduction in the number of vertical component variations. In the illustrated alternative, pivot 34 is a removable hinge pin extending through apertures in hinge pin retainers associated with the respective hinge plates, and only one hinge plate 36 is connected to each hinged vertical component. Single hinged vertical components 18 are formed by matching a free hinge plate 36 with each hinge plate connected to tubular member 28 to align the hinge pin retainers and apertures and inserting a pin 34, and double hinged vertical components 20 are formed by matching hinge plates connected to two tubular members and inserting pins 34 to connect the two vertical members.

The shutter system of the invention may also utilize rigid or semi-rigid shutter panel covers, or inserts, 16 without departing from the scope of the invention. In a further alternative embodiment, illustrated in FIG. 7, a rigid panel insert 16 is used and vertical and horizontal members 28 and 26 are modified to receive and retain rigid insert 16. As illustrated, each vertical and horizontal member is provided with a slot 80 along its inner edge to receive the respective edge of a panel insert 16 during assembly of a shutter panel. In the alternative embodiment illustrated, corner connectors 78 are used to interconnect vertical and horizontal members, but other connector means may be utilized.

In the preferred embodiment, vertical and horizontal members 28 and 26 are of circular cross-sectional configuration and are constructed of metal, though it will be understood that any suitable cross-sectional configuration and any suitable material of construction may be utilized. The components of the shutter system of the invention may also be provided in a wide variety of finishes and/or colors, as well.

In using the shutter system of the invention, a user first identifies the window or windows to receive shutter units, determines the dimensions of the window, determines the desired shutter configuration, and determines the shutter panel cover or insert style and color desired. Determination of the desired shutter configuration is almost entirely a matter of design or aesthetic choice for the user, and involves selection of the number of shutter panels to be used across the width of the window, how and where the panels are to be hinged to the window and to each other, and the number of tiers of shutter units to be used over the portion of the height of the window to be covered. The user then determines the number of component pieces of each type needed to form the desired shutter units and determines the appropriate length of each component needed.

The user then obtains the appropriate components of the shutter system determined to be needed and obtains the material selected for shutter panel covers of inserts. Each panel insert is prepared by, in the preferred embodiment of the method of use, hemming each vertical edge of each insert and preparing a tunnel in each horizontal edge, with the distance between such tunnels equal to the distance between the associated horizontal components of the shutter panel to be assembled. Vertical and horizontal components are adjusted in length as needed and an insert is placed in the end of each vertical member. A horizontal component is inserted through each tunnel of each panel cover with the ends of the horizontal component extending beyond the ends of the tunnel, vertical members are put in place and aligned with the horizontal components and fastener pins are inserted and tightened to form each shutter unit. Internal bracing, if used, is then installed in each shutter panel.

Each assembled shutter unit is placed in the window in which it is to be installed and each window hinge is attached to the window frame to suspend the respective shutter unit in the window opening, completing the installation of the shutter unit. The foregoing assembly and installation steps are repeated for each shutter unit to be used. Once each shutter unit is installed in a window the shutter unit need not be disconnected from the window when or if cleaning, or replacement, of shutter panel covers is desired. Appropriate modifications to the described method steps can readily be made to accommodate alternative embodiments of the components of the shutter system of the invention.

The foregoing detailed description of the preferred and certain alternative embodiments of the components of the shutter system of the invention, and of the method of the invention, is illustrative and not for purposes of limitation. Both structure and method are susceptible to various other modifications and alternative embodiments without departing from the scope of the invention as claimed.

What is claimed is:

1. A window shutter system comprised of components in modular form for user assembly of openable and closable multi-panel window shutter units to be installed as a covering for a window having a perimeter window frame, comprising:
   single-hinged vertical components, each to be pivotally connected to a window frame, said single-hinged vertical components comprising:
   a vertical elongate member having a longitudinal axis and first and second ends; and
   window hinge means for the purpose of pivotally connecting said first vertical elongate member to a window frame, said window hinge means being symmetrically disposed on said first vertical elongate member between said first and second ends thereof and interconnected thereto such that said window hinge means extends outwardly from said first vertical elongate member;
   double-hinged vertical components, each to form a common element between adjacent connected shutter panels of a shutter unit, said double-hinged vertical components comprising:
   a pair of second vertical elongate members of equal length, each of said second vertical elongate members having a longitudinal axis and first and second ends, disposed in separated parallel relation with their respective ends in alignment; and
   panel hinge means interconnected between said second vertical elongate members so as to form a pivotal connection therebetween, with said panel hinge means symmetrically disposed between said first and second ends of said second vertical elongate members;
   single non-hinged vertical components, each including a third vertical elongate member with a longitudinal axis and first and second ends; horizontal components, to be interconnected in pairs between aligned first ends and between aligned second ends of any two of said first vertical elongate members, said second vertical elongate members, and said third vertical elongate members two vertical components of said single-hinged vertical components, said double-hinged vertical components, and said single non-hinged vertical components to form discrete shutter panel frames, said horizontal components including comprising:
   a horizontal elongate member with a longitudinal axis and first and second ends, and
   alignment means to align said horizontal components relative to said first, second and third vertical elongate members of said vertical components single-hinged vertical components, said doubled-hinged vertical components, and said single non-hinged vertical components;
   interconnecting means for interconnecting said horizontal components to said first, second and third vertical elongate members of said vertical components single-hinged vertical components, said double-hinged vertical components, and said single non-hinged vertical components; and each of said first, second and third vertical elongate members open at both first and second ends, wherein each of said horizontal elongate members of said horizontal components includes a first aperture extending through said member perpendicular to said longitudinal axis thereof and adjacent to said first end thereof, and a second aperture extending through said member perpendicular to said longitudinal axis thereof and adjacent to said second end thereof, and wherein said interconnecting means comprises:

a plurality of inserts, each having a longitudinal axis and first and second ends and each having a central aperture extending into the interior thereof from said second end thereof in coaxial alignment with the longitudinal axis of said insert, each of said inserts to be inserted into an open end of a said first, second and third vertical elongate members and retained therein with said second end of said insert adjacent to the associated end of said first, second and third vertical elongate members; and a plurality of fastening pins, each to be inserted through an aperture of a horizontal component and into a central aperture of an insert retained in a first, second or third elongate member to form a secure connection between said horizontal component and said single-hinged vertical components, said double-hinged vertical component or said single non-hinged vertical components with which said first, second or third vertical elongate member is associated.

2. The window shutter system of claim 1 wherein each of said inserts is formed of a resilient material and wherein each of said inserts is frictionally retained within the end of the associated first, second and third vertical elongate member.

* * * * *